Patented May 1, 1934

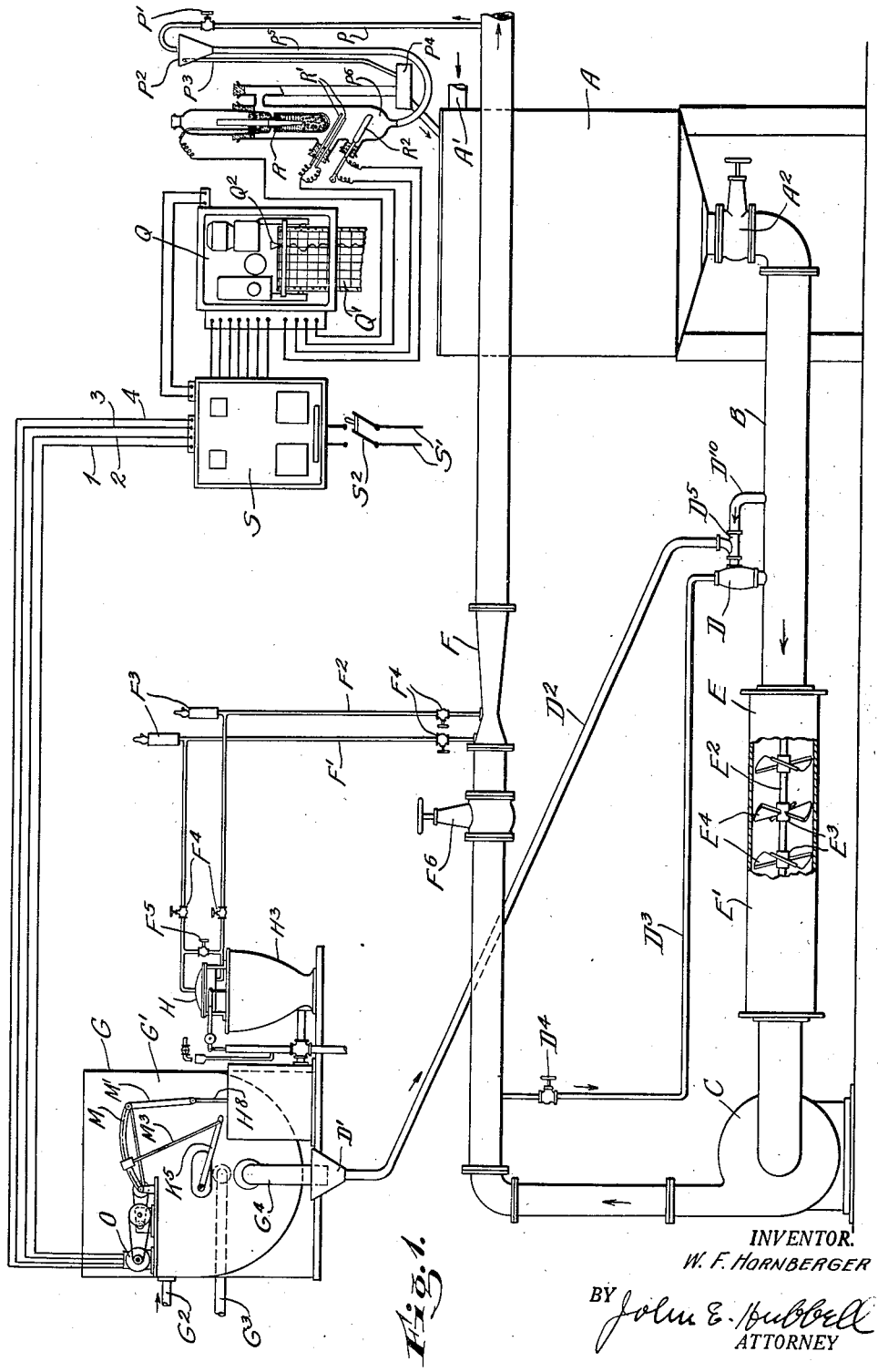

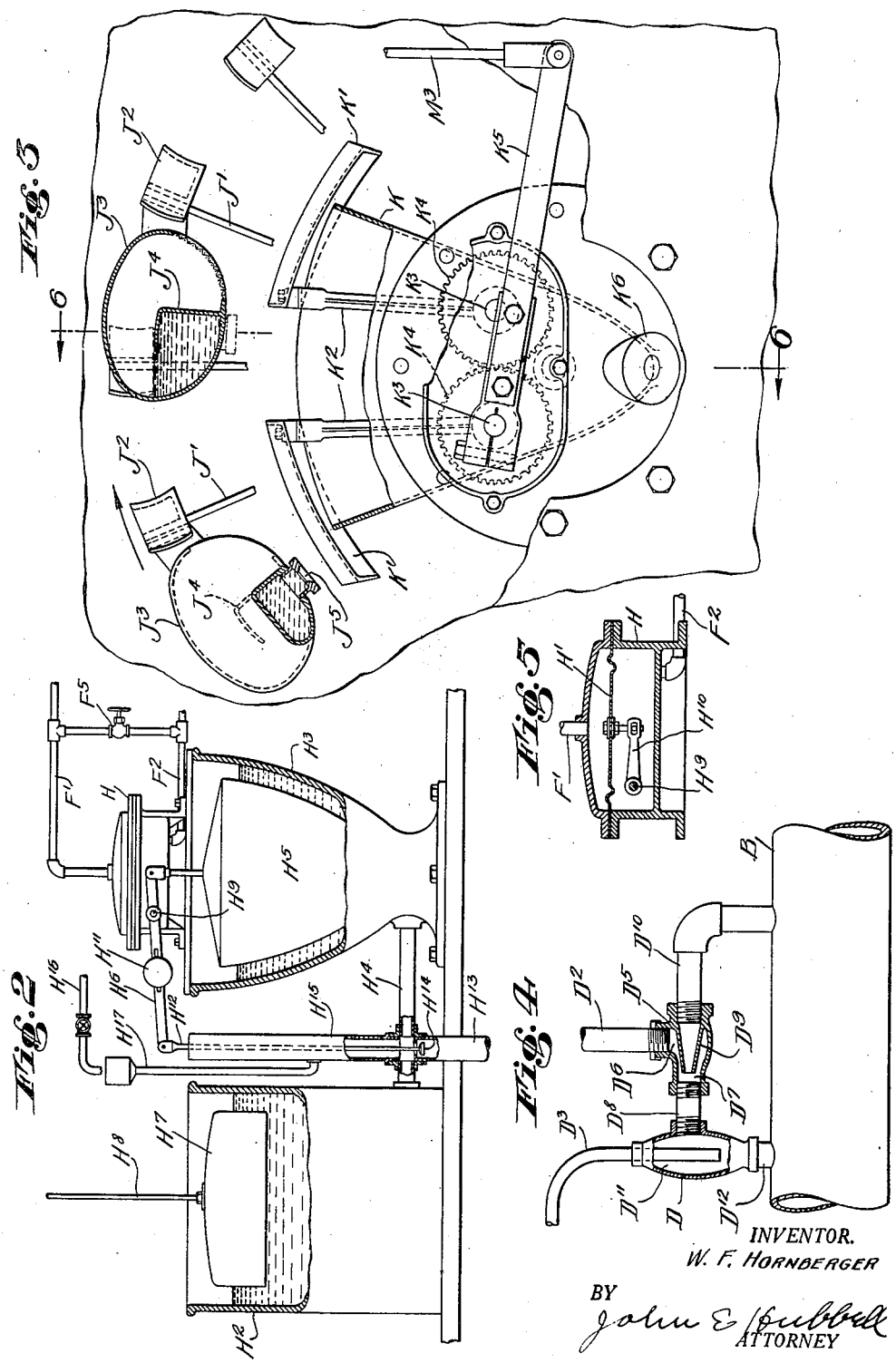

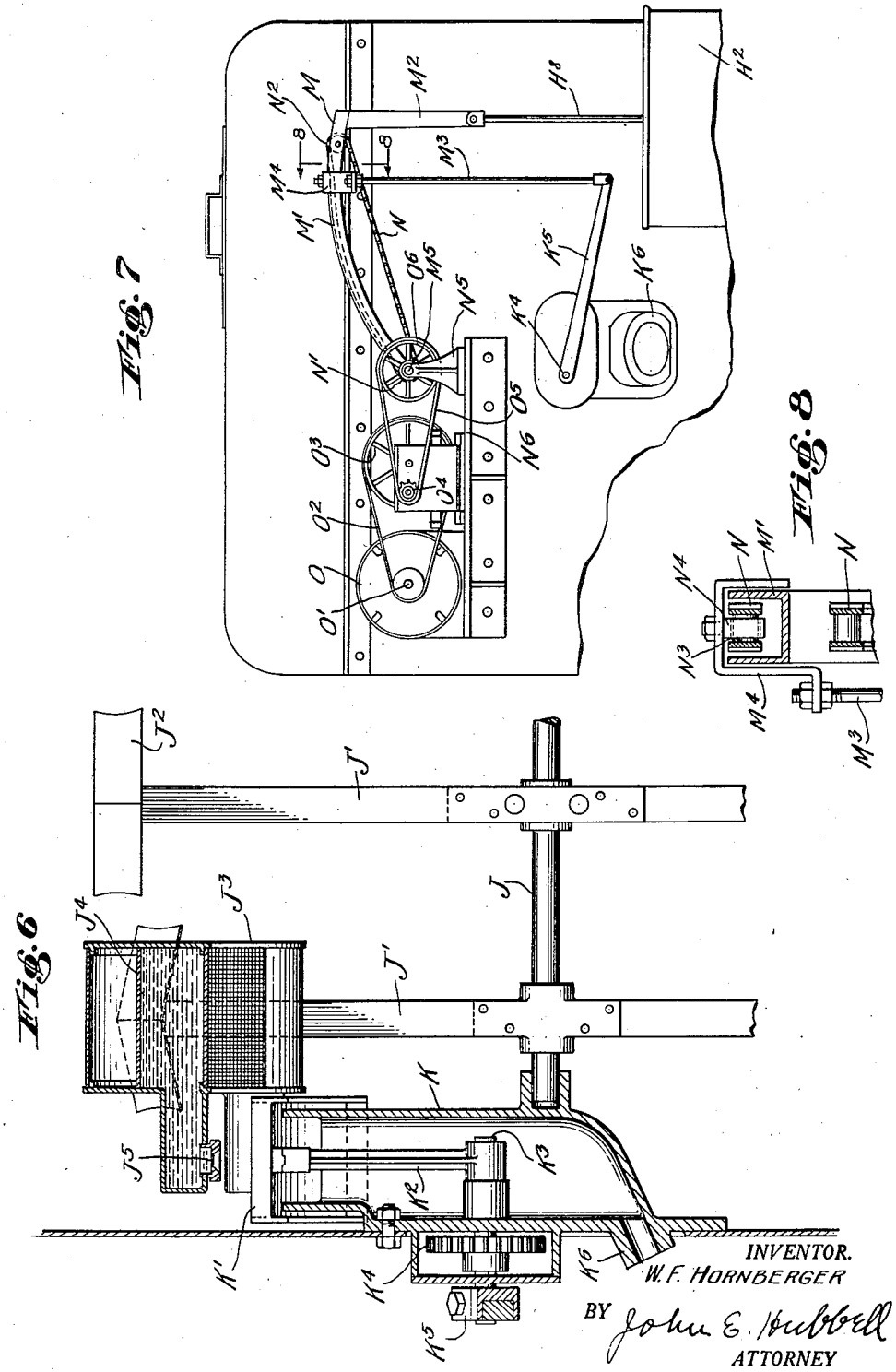

1,956,741

UNITED STATES PATENT OFFICE

1,956,741

MANUFACTURE OF RAW SUGAR

William F. Hornberger, Miranda, Cuba

Application March 7, 1930, Serial No. 433,905

13 Claims. (Cl. 127—48)

My present invention relates in general to the manufacture of raw sugar and particularly to that portion of the juice defecation process in which an emulsion of calcium hydroxide, generally known as "milk of lime", and hereinafter referred to as "lime", is added to the sugar cane juice to regulate the acidity thereof and thereby prevent hydrolysis, or "inversion", of the sugar in solution and aid the precipitation of impurities.

The defecation of sugar cane juice, as usually performed, comprises the conveying of the juice from cane crushing mills through a measuring tank or scales to a pump supply or receiving tank, whereby it may be mixed with other sugar factory liquids, such as filter press juice or tank washings. The supply of juice to the receiving tank is not constant due to the varying feed of cane through the crushing mills and to the varying quantity of juice held back in the mill bed by bagasse falling from the cane conveyors. A predetermined amount of lime is then added to the cold juice. The limed juice is passed through one or more juice heaters to the defecators where the coagulated impurities settle out and from which the clear hot juice is decanted.

It is well known that the concentration of free hydrogen ions in a solution is a measure of the dissociated acid, and the concentration of the free hydroxyl ions a measure of the dissociated base. The amount of dissociated acid or base present therefore determines the effective acidity or alkalinity of the solution. These facts are utilized in modern defecation processes in measuring the acidity of the juice for the purpose of determining the required amount of lime to be added to bring the juice to a desired condition. Inasmuch as a state of neutralization or slight alkalinity of the juice leaving the heaters is generally advantageous to secure good defecation; i. e., protection against inversion, a clear and bright juice, and rapid settling, it is essential to the defecation process that the amount of lime to be added be accurately determined, as both overliming and underliming of the juice produce unsatisfactory defecation.

The desirable hydrogen ion or "H-ion" concentration of the hot limed juice passing to the defecators being known, all defecation processes attempt to maintain the final H-ion concentration uniform. The H-ion concentration of the juice varies to some extent after the lime has been added and while the limed juice passes through the heaters bcause of the substantial time interval elapsing and primarily because of the varying chemical characteristics of the juice from different cane sources. It is the practice to attempt to control the H-ion concentration of the cold limed juice only.

One of the practices widely used heretofore has been to deliver the raw juice into separate liming tanks; test the juice in each batch either colorimetrically or electrometrically to determine the required amount of lime to be added; and to then add the determined amount of lime to each tank. The usual disadvantages of intermittent processes are present in such arrangements. The use of automatic liming devices in such systems has been widely condemned because of the wide variations in H-ion concentration of the juice in different tanks and the difficulty in devising automatic devices which could properly compensate for such varying conditions.

In recent years experiments have been made towards automatically and continuously controlling the amount of lime in accordance with the varying acidity of the limed juice for the usual purpose of securing a substantially uniform final H-ion concentration. One type of control apparatus used in the experimental installations has followed the electrometric method of measuring the H-ion concentration and the amount of lime supplied to the flowing juice has been manually or automatically regulated in accordance with the H-ion concentrations obtained. Such control instruments are preferably calibrated in terms of the pH unit, which is defined as being equal to the logarithm of the reciprocal of the H-ion concentration. The results obtained in automatically controlled defecation processes such as stated above, have been considerably less than expectations. I have determined that this has been primarily due to the failure to compensate for the variations in flow of the juice in the pipe line; to the lack of suitable means for securing a homogeneous mixture of the juice and lime in the time interval available; and to the excessive time interval elapsing during the passage of the limed juice from the liming station to the point in the juice line thereafter at which the pH readings were taken, which caused excessive hunting of the control instrument.

The general object of my present invention is to provide an improved method of and apparatus for automatically and continuously supplying lime to the juice to maintain a uniform final H-ion concentration of the juice, and more specifically, to regulate the amount of lime supplied in accordance with the rate of flow of the juice to be treated and the H-ion concentration or pH value of the limed juice passing to the heaters. In carrying out my invention I have provided a defecation system which comprises lime proportioning and feeding apparatus for automatically maintaining a definite ratio between the amount of lime supplied and the varying flow of juice through the feed line; and a measuring, recording and controlling instrument for measuring the H-ion concentration of the limed juice and which automatically effects a control action on the flow proportioning apparatus to vary the established ratio of lime to juice in accordance with the variations in juice requirements as determined by the H-ion concentration values of the limed juice. In addition to, and operating in conjunction with the foregoing apparatus, I have provided apparatus for effectively adding the proportioned amount of lime to the flowing juice, and for intimately mixing and agitating the lime and juice before delivery to the heaters without materially changing the velocity of the flowing mixture. Other novel features of my invention reside in locating the juice flow responsive element of the proportioning and feeding apparatus in the feed line at a point having approximately the same rate and conditions of juice flow as occurs at the point in the juice line where the lime is added, and in locating the H-ion concentration or pH value measuring section of recording and controlling instrument adjacent to the flow responsive element of the proportioning apparatus and the liming station.

The various features of novelty which characterize my invention are pointed out with particularity in the claims annexed to and forming a part of this specification. For a better understanding of the invention, however, and the advantages possessed by it reference should be had to the accompanying drawings and descriptive matter in which I have illustrated and described a preferred embodiment of the invention.

Of the drawings:—

Fig. 1 is a view, partly diagrammatic, of a portion of a juice defecation system incorporating my invention;

Fig. 2 is an elevation with parts broken away of a portion of the flow responsive means;

Fig. 3 is an end view with certain parts broken away of the lime proportioning and feeding apparatus;

Fig. 4 is an elevation partly in section of the eductor;

Fig. 5 is a vertical section of the differential pressure device shown in Figs. 1 and 2;

Fig. 6 is a vertical section on the line 6—6 of Fig. 3;

Fig. 7 is an end view of the lime feeding apparatus illustrating the lime-juice ratio regulating apparatus; and Fig. 8 is a vertical section on the line 8—8 of Fig. 7.

In Fig. 1 of the drawings I have illustrated a partly diagrammatic layout of a portion of a sugar cane juice defecation system. As shown, raw juice is delivered from the mills through one or more inlet pipes A' to a juice receiving tank A, from the lower end of which it is continuously withdrawn into a pipe line B by a pump C located in the juice line either before or after a liming device D and a mixer or coagulator E. The juice supply from the tank A can be controlled by a suitable cut-off valve $A^2$ located immediately below the juice outlet in the bottom of the tank. The juice after being limed, as is hereinafter described, is passed through the mixer E which intimately mixes and violently agitates the mixture. The limed juice leaving the mixer is discharged by the pump C through one or more juice heaters (not shown), from which after being heated to a predetermined temperature, it is passed into the defecators (not shown), where the mud settles, the impurities are precipitated and the clear juice decanted. This general arrangement can be and is frequently modified for different local operating conditions and frequently several of the steps may be reversed in order or combined in one apparatus.

According to the present invention, the supply of lime delivered to the pipe line B is regulated in accordance with several varying conditions of the juice, one of which is the rate of juice flow through the pipe line B. One suitable form of proportioning mechanism for regulating the supply of lime in accordance with the juice flow comprises a juice flow measuring mechanism including a pressure differential creating device, such as a Venturi tube F, incorporated in the juice line B and having pipe connections F' and $F^2$ leading from its mouth and throat, respectively, to opposite sides of a diaphragm H', forming the movable element of a differential pressure measuring device H. The Venturi pipe connections are provided with suitable test cocks $F^3$, cut-off valves $F^4$ and a pressure equalizing valve $F^5$. Periodic flushing of the pipe connections to remove fiber deposits therein is desirable. A cut-off valve $F^6$ is preferably placed in the juice line immediately before the Venturi device. As hereinafter described, the movements of the diaphragm H' in response to changes in the rate of juice flow are utilized to regulate the amount of lime discharged from a suitable lime feeding apparatus G.

The lime feeding apparatus illustrated comprises a tank G' to which lime is fed from a source of supply through an inlet pipe $G^2$ and which is provided with an overflow connection $G^3$ connected to a predetermined level in the tank, whereby a substantially constant quantity of lime is maintained in the lower part of the tank. The tank contains suitable mechanism for delivering lime of uniform quality to a lime discharge connection $G^4$ at a constant rate. This mechanism as illustrated in Figs. 3 and 6 comprises a horizontal drive shaft J extending longitudinally of the tank and rotated by suitable driving mechanism mounted externally of the tank. At longitudinally spaced points on the drive shaft, radial agitator arms J' are secured, each of which carry a plow shaped agitator at its outer end. The agitators are arranged to revolve in parallel vertical planes, effecting a vertical circulation of the lime in the tank and thus preventing stratification of the lime. A plurality of pairs of agitator arms are arranged in the same vertical plane at the front end of the shaft and each of these arms also carries a measuring cup $J^3$ secured thereto and constructed to pick up a predetermined amount of lime from the body of liquid in the bottom of the tank during each revolution and deliver a variable portion of that amount to a collector funnel K. The funnel K is arranged with its upper open end in front of and below the upper portion of the path of movement of the cups, but sufficiently adjacent thereto to receive lime from the cups during this portion of their movement. The measuring cup construction illustrated is well known and comprises a screen covered overflow weir $J^4$ over which surplus liquid in the cup flows as the cup turns towards its discharging position. The cups are designed to discharge a stream of lime through laterally positioned discharge orifices $J^5$ into the funnel K at a constant rate irrespective of the speed of the drive shaft. The amount of lime so discharged into the collector funnel is regulated by the position of a pair of arcuate cut-off shields $K'$ mounted on radial arms $K^2$. The shields extend immediately above a regulable portion of the upper end of the funnel and lime discharged thereon from the passing cups flows down the shields to the tank. The arcuate spacing of the shields determines the amount of lime delivered to the funnel. The shield arms $K^2$ are connected to parallel shafts $K^3$, which are interconnected for simultaneous movement in opposite directions by external gears $K^4$. These gears are rotated by a lever $K^5$ connected to an external portion of one of the shafts $K^3$ so that the shields are angularly moved towards and away from each other to decrease and increase, respectively, the rate at which lime is discharged into the funnel as the lever $K^5$ is lowered or raised. For each position of the cut-off shields or lever, lime is delivered at a corresponding rate to the funnel outlet $K^6$, connected to the pipe $G^4$, irrespective of the rotation of the drive shaft J.

The proportioning mechanism mentioned above is utilized for regulating the position of the cut-off shields and thereby the rate of discharge of lime. This mechanism comprises a control float chamber $H^2$ and a regulating float chamber $H^3$ interconnected by a pipe $H^4$ to provide equality between the liquid levels therein. The regulating float chamber is parabolic in form and includes a parabolic regulating float $H^5$ connected at its upper end to one end of an operating lever $H^6$. The control float chamber $H^2$ is cylindrical in form and contains a substantial cylindrical control float $H^7$ which is connected through a variator arm M and a float rod $H^8$ to the shield operating lever $K^5$. The vertical movements of the diaphragm $H'$ are transmitted to the lever $H^6$ through a short horizontal shaft $H^9$ extending through the wall of the diaphragm chamber and connected at its inner end to the diaphragm by an arm $H^{10}$ and at its outer end to the lever $H^6$, whereby vertical movements of the diaphragm effect corresponding angular movements of the lever $H^6$. The lever $H^6$ carries an adjustable counter-weight $H^{11}$ to partly balance the weight of the float $H^5$. The opposite end of the lever $H^6$ is pivotally connected to a vertical valve rod $H^{12}$ arranged in a pipe $H^{15}$ connected to the chamber supply pipe $H^4$. The rod $H^{12}$ carries a relief valve $H^{14}$ at its lower end below the junction of the pipes $H^4$ and $H^{15}$ and controlling the discharge of water from those pipes to a waste pipe $H^{13}$. A constant supply of water is delivered at a relatively rapid rate to the pipe $H^{15}$ from a water supply pipe $H^{16}$ controlled by a valve $H^{18}$ into a funnel $H^{17}$ connected to the pipe $H^{15}$. The position of the valve $H^{14}$ determines the amount of water diverted to the float chambers $H^2$ and $H^3$ to vary the position of the float $H^5$ to neutralize the differential pressure on the diaphragm $H'$. The discharge capacity of the valve $H^{14}$ is advantageously greater than the rate of water supply, thereby permitting the water in the float chambers $H^2$ and $H^3$ to drain when a decrease in the rate of juice flow through the Venturi tube occurs.

With this arrangement of the parts, the water level in the control float chamber $H^2$ is always directly proportional to the flow of limed juice through the venturi F and consequently the vertical movements of the control float $H^7$ transmitted to the shield operating lever $K^5$ are also in direct proportion to the rate of flow of juice. In one installation of which I have knowledge, a lime suspension of 6° Baumé (5–6% CaO) was fed in proportions of 5 to 15 gallons of lime to every 1000 gallons of juice.

The lime feeding apparatus and the proportioning mechanism described heretofore are, with the exception of the variator M hereinafter described, a standard type of liquid regulating apparatus, the construction and mode of operation of which are well known in the art and not novel per se with me. I have discovered its adaptation for use in the field of liming sugar cane juice and have evolved certain improvements hereinafter described to render it more effective for this purpose.

As illustrated in Figs. 1, 7 and 8, the free end of the shield lever $K^5$ is adjustably connected to the variator arm M by a variator rod $M^3$, the upper end of which carries an inverted U-shaped bracket $M^4$. The variator arm has an upper quadrant section $M'$ and a lower vertical section $M^2$, to which the rod $H^8$ is pivotally connected. The quadrant section $M'$ is formed by a channel bar extending in an arc about a variable center and pivoted on a shaft $M^5$ at its lower end. With this arrangement the vertical movements of the float rod $H^8$ are transmitted through the variator sections $M^2$ and $M'$ and the rod $M^3$ to effect an angular movement of the shield lever $K^5$ and a corresponding movement of the shields.

The adjustable connection between the bracket $M^4$ of the rod $M^3$ and the variator quadrant $M'$ by which the angular movement of the shield lever $K^5$ is varied in accordance with a second variable comprises an endless chain N extending between a sprocket wheel $N'$ secured to the shaft $M^5$ and a second sprocket wheel $N^2$ connected to the opposite end of the quadrant $M'$. The upper run of the chain is partly guided in the channel formed in the quadrant, as shown in Figs. 7 and 8. One of the link cross-bars $N^3$ of the chain is passed through an eye bolt $N^4$ depending from the bracket $M^4$ to connect the variator rod $M^3$ to the chain and quadrant.

The shaft $M^5$ and sprocket wheel $N'$ are shown as rotatably supported in a standard $N^5$ mounted on a shelf $N^6$, which is secured to the front end of the tank $G'$. A reversible electric motor O is also supported on the shelf $N^6$ and connected to the shaft $M^5$ through a series of speed reducing gears and endless chains $O'$, $O^2$, $O^3$, $O^4$, $O^5$ and $O^6$. Rotation of the motor O in either direction effects corresponding movements of the chain N to vary the position of the bracket $M^4$ on the quadrant. When the float $H^7$ is in its lowest position which would correspond to a zero rate of flow of juice, the center of the quadrant $M'$ would coincide with the pivot connection between the shield lever $K^5$ and variator rod $M^3$. The shields $K'$ would be entirely closed in that position of the float $H^7$ and movement of the bracket $M^4$ on the quadrant would not effect any change in the angular position of the shield lever. When the float $H^7$ rises with an increase in the rate of flow of juice, the geometrical center of the arc of the quadrant $M'$ shifts laterally and upwardly in accordance with the change in position of the float and consequently of the quadrant. Movement of the bracket $M^4$ along the quadrant will then effect a corresponding change in position of the shield K⁵ to vary the the extent of opening of the shields.

The higher the position of the float H⁷ and consequently the free end of the quadrant, the greater will be the inclination of the quadrant and the greater the change in shield lever position effected by a given movement of the bracket M⁴ on the quadrant. The variator mechanism described and illustrated is designed to give a variation of 20% to 100%, i. e. in any position of the float H⁷, the extent of opening of the shields with the bracket M⁴ at the quadrant end adjacent the shaft M⁵ is 20% of the extent of opening when the bracket is at the opposite end of its range of movement. Suitably calibrated indicating or recording mechanism may be connected to the control float and/or the shield lever to exhibit the rate of flow of limed juice through the venturi and/or rate of feed of the lime.

The defecation system illustrated also comprises electrometric apparatus for measuring, recording and controlling the H-ion concentration of the limed juice. As illustrated in Fig. 1 this apparatus comprises a sampling pipe connection P to the limed juice line at a point relatively adjacent the liming station, whereby the juice after being limed reaches the sampling connection in a relatively short time. The pipe P is controlled by a valve P' and delivers a continuous flow of limed juice to a receptacle P², the liquid level and head therein being maintained constant by an overflow connection P³ discharging through a container P⁴ to juice receiving tank A. A constant and rapid flow of limed juice passes from the receptacle P² through a U-shaped tube P⁵ to an electrode or flow chamber P⁶ from which it overflows into a pipe P⁷, also discharging to the receptacle P⁴. Apparatus is provided for measuring the H-ion reaction of the limed juice passing through the flow chamber P⁴. Such apparatus is now well known in the art and the general type is illustrated in the United States patent of Smith, No. 1,684,645, granted September 18, 1928. Inasmuch as the H-ion concentration measuring, recording and controlling mechanism is not novel per se with me and is well understood by those skilled in the art, only a brief description herein is considered necessary.

The flow chamber P⁴ contains an electrode R, which may well be a saturated calomel half cell, and a suitable metallic electrode R', preferably consisting of a pair of tungsten electrodes connected in parallel and in contact with the flowing juice, the specific construction of such electrodes being well understood in the art. A temperature compensator R² is also arranged in the flow chamber to automatically compensate the electrode circuit for variations in the pH value due to temperature changes. The electrode circuit forms the operating circuit of an automatic recording and controlling potentiometer Q, one form of which is shown, for example, in said prior patent of Smith. It is well known that calomel electrode has a constant voltage irrespective of changes in the H-ion concentration while the tungsten electrodes respond to every change in the H-ion concentration. The variations in H-ion concentration are recorded by the instrument operating mechanism on a strip chart Q' by a marking pen Q², as is conventionally illustrated.

The potentiometer operating mechanism is periodically connected for a short interval to suitable switch-actuating relays in the container S by which the conductors 1, 2, 3 and 4 leading to the motor O are selectively connected to a source of electric energy, indicated by the supply line S' and switch S², to effect a rotation of the motor O in a direction dependent on the direction of variation of H-ion concentration from a predetermined value or operating range as measured by the instrument Q.

The rate of discharge of lime from the tank G being proportioned and regulated as heretofore described, the lime passes from the discharge pipe G⁴ into a funnel D' connected through a pipe D² to the liming device D. The device D by which the lime is forced into the stream of juice in the pipe B preferably operates on the injector principle. The operating fluid for the injector D is limed juice taken from the pipe B at a point beyond the discharge of the pump C and passed through a pipe D³ controlled by a cut-off valve D⁴ to the injector. The lime feed line D² is connected at its lower end to one leg of a special non-return T D⁵, as illustrated in Figs. 1 and 4. The T includes a vertical inlet passage D⁶, which opens into a horizontal passage D⁷, one end of which is connected by a pipe D⁸ to the injector. A horizontal tapered nozzle D⁹ is formed in the T passage D⁷ with its enlarged end connected by a pipe D¹⁰ to the juice line before the liming point. The injector has an elongated tapered chamber D¹¹ into which the lower end of the pipe D³ extends to a point beyond the point of connection of the pipe D⁸. The lower end of the chamber D¹¹ is connected to the juice line B by a pipe D¹², as shown.

With this construction and arrangement, the limed juice from the pipe D³ induces a rapid flow of the lime from the pipe D² through the T and injector chamber into the juice line under normal juice flow conditions. When the amount of lime discharged from the tank G' is less than the capacity of the injector, the deficiency is made up by raw juice drawn from the pipe B through the nozzle D⁹. By this arrangement the amount of air entering the upper end of the feed line D² at light loads on the injector is minimized with consequent increase in the efficiency of the pump C. The injector apparatus D is advantageously at a level below the juice level in the receiving tank A. A proper selection of the parts of the liming unit as to size and capacity insures a positive and uniform injection of the lime into the flowing juice at all times and a circulation of juice only in the juice line B if the supply of lime from the tank G' is cut off for any reason.

Between the liming point and the point where the sampling connection P is made is arranged the mixer or coagulator E which serves to effect a thorough and intimate mixture of the lime and juice. The mixer E may be arranged in the juice line either in the suction or discharge end of the pump C and preferably comprises a cylindrical casing E' of a larger cross-sectional area than the pipe B in which it is incorporated and of a length determined by the amount of mixing desired. A central stationary rod E² extends longitudinally within the casing and has secured thereon at longitudinally spaced points a plurality of flow directing blade units E³, each of which has a plurality of blades E⁴ extending radially from the shaft E² to the inner wall of the casing. The blades of adjacent units are preferably constructed of opposite pitch and the individual blades of each unit arranged opposite the inter-blade openings of the preceding unit. By this arrangement the mixture of lime and juice passing through the mixer is continuously divided by the successive blade units into a plurality of streams having a sinuous path of flow, whereby the limed juice passing to the heaters is of uniform composition. The limed juice, as shown, passes from the mixer to the pump C, the speed of which is regulated to deliver the limed juice to the venturi at the same velocity as the raw juice passing the liming station.

The operation of my improved process and apparatus will be readily understood from the foregoing description. The advantageous features of the system include the continuous and automatic proportioning of the amount of lime delivered to the juice in accordance with the amount of juice passing through the apparatus; a periodic regulation of this proportioning in accordance with the extent of variation in H-ion concentration or pH value of the limed juice from a predetermined value; the rapid delivery of the amount of lime proportioned to the juice; a thorough mixing and coagulating of the lime and juice before measuring the H-ion concentration for control purposes; and the relative arranging and proportioning of the various portions of the apparatus, whereby the flow of juice is measured at a point having the same flow velocity as at the liming station and the H-ion concentration is measured at a point adjacent to the liming point.

By the process disclosed herein and with the apparatus constructed and arranged as described, I have been able to secure a more uniform and regular liming of the juice; a more thorough and rapid mixture of the lime and juice; a decrease in the amount of high local over-limed juice passing through the heaters and in consequence a lighter colored juice withdrawn from the defecators containing a lower amount of soluble calcium salts; a greater occlusion of the smaller particles of impurities and their removal from the juice due to the thorough mixing and accurate proportioning of the lime and juice before reaching the heaters than would occur if the mixing took place in the defecators; a precipitation of certain types of impurities before the juice is heated due to the thorough and rapid mixing of the lime and juice; a decrease in local underlimed juice with its accompanying incomplete removal of impurities; a more compact and dense mud settling out of the defecators with corresponding advantages in handling at the filter press station; a mud that requires only a minimum amount of reliming and therefore less tendency to dissolve part of the previously removed impurities; automatic compensation of slight variations in the strength of the lime solution before a substantial amount of over or underlimed juice has been delivered to the heaters; and finally the delivering of limed juice of uniform H-ion concentration to the heaters under all operating conditions.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims and that in some cases certain features of my invention may be used to advantage without a corresponding use of other features.

Having now described my invention, what I claim as new and desire to secure by Letters Patent is:—

1. The method of continuously liming a varying supply of sugar cane juice which comprises proportioning the lime to be delivered to the juice in accordance with the amount of juice to be treated and further regulating the amount of lime to be delivered in accordance with the H-ion concentration of the juice.

2. The method of continuously liming a varying supply of sugar cane juice which comprises continuously proportioning the lime to be delivered to the juice in accordance with the amount of juice to be treated, and further regulating the amount of lime to be delivered in accordance with the pH value of previously limed juice.

3. The method of continuously liming a varying supply of sugar cane juice which comprises continuously proportioning the amount of lime to be delivered in accordance with the amount of juice to be treated, and periodically regulating the proportioning in accordance with the H-ion concentration of the limed juice.

4. The method of continuously liming a varying supply of sugar cane juice which comprises automatically and continuously proportioning the amount of lime to be delivered in accordance with the amount of juice to be treated, and periodically effecting an automatic regulation of the amount of lime to be delivered in accordance with the variations in the H-ion concentration of the limed juice from a predetermined value.

5. The method of continuously liming a varying supply of sugar cane juice which comprises continuously proportioning the amount of lime to be delivered to the juice in accordance with the amount of juice to be treated, continuously measuring the pH value of the limed juice, periodically regulating the proportioning of the lime in accordance therewith, feeding the amount of lime so proportioned to the juice to be limed, and effecting a thorough and intimate mixture of the lime and juice before the limed juice reaches the point where its pH value is measured.

6. The method of continuously liming raw sugar cane juice which comprises continuously proportioning the amount of lime to be delivered to the raw juice in accordance with the rate of flow of the juice to be treated at the liming point, continuously measuring the pH value of the limed juice, periodically regulating the proportioning of the lime in accordance with the variation of the limed juice from a predetermined pH value, injecting the lime so proportioned into the raw juice, and effecting an intimate mixture of the lime and juice before the limed juice reaches the point where its pH value is measured.

7. Apparatus for continuously liming a varying supply of sugar cane juice comprising in combination, means for proportioning the lime in accordance with the amount of juice to be treated, and means for regulating the action of said proportioning means in accordance with the H-ion concentration of the juice.

8. Apparatus for continuously liming a varying supply of sugar cane juice comprising in combination, means for continuously proportioning the lime in accordance with the amount of juice to be treated, and means for periodically regulating the action of said proportioning means in accordance with the H-ion concentration of the juice.

9. Apparatus for continuously liming a varying supply of sugar cane juice comprising in combination, automatically operating means for continuously proportioning the amount of lime to be delivered to the juice in accordance with the amount of juice to be treated, and periodically operated means for automatically regulating the action of said proportioning means in accordance with the H-ion concentration of the limed juice.

10. A sugar cane juice defecation system comprising in combination, an untreated juice receiving tank, a juice pipe line connected to said tank, means for pumping juice from said tank through said pipe line, a lime supply apparatus, means for regulating the rate of discharge from said lime supply apparatus in accordance with the rate of juice flow in said pipe line, means for delivering the lime discharged to said pipe line, means for intimately mixing the lime and juice, and means for periodically varying the action of said regulating means in accordance with the variation in H-ion concentration of the limed juice from a predetermined value.

11. Automatic liming apparatus comprising a tank containing a supply of lime, means for discharging lime at constant rate from said tank, means for automatically varying said rate in accordance with the amount of sugar cane juice to be limed, and periodically operated means for automatically varying the operation of said last mentioned means in accordance with the variations in the H-ion concentration of the limed juice from a predetermined value.

12. Automatic liming apparatus comprising a tank containing a supply of lime, mechanism in said tank for discharging lime therefrom at a constant rate, angularly movable means for varying the rate of lime discharge, flow responsive means connected to a conduit containing the sugar cane juice to be limed, means operatively connecting said flow responsive means to said rate varying means comprising a vertically moving float, and means for automatically varying the proportion of angular movement of said rate varying means to the vertical movement of said float in accordance with the variations in the H-ion concentration of the limed juice from a predetermined value.

13. The method of adding a chemical reagent to a stream of sugar juice which consists in measuring the rate of flow of said stream, measuring the pH value of the juice, adding said reagent in predetermined proportion to said rate, and varying the said proportion in accordance with changes in said value.

WILLIAM F. HORNBERGER.